United States Patent [19]

Fazeli et al.

[11] Patent Number: 4,909,083

[45] Date of Patent: Mar. 20, 1990

[54] PRESSURE/DIFFERENTIAL PRESSURE MEASURING DEVICE

[75] Inventors: Abdolmajid Fazeli, Los Angeles; Joseph J. Ponzi, Alhambra; Ernst R. Ginkel, San Dimas, all of Calif.

[73] Assignee: ITT Corporation, New York, N.Y.

[21] Appl. No.: 371,346

[22] Filed: Jun. 26, 1989

[51] Int. Cl.[4] .......................... G01L 7/08; G01L 9/06; G01L 13/02

[52] U.S. Cl. ........................................ 73/706; 73/721

[58] Field of Search ................ 73/706, 182, 720, 721, 73/753, 754, 756, 861.47; 338/4

[56] References Cited

U.S. PATENT DOCUMENTS 1,018,561  2/1912  Hitchcock ...................... 73/861.47
4,841,776  6/1989  Kawachi et al. ................... 73/706

Primary Examiner—Donald O. Woodiel
Attorney, Agent, or Firm—Menotti J. Lombardi

[57] ABSTRACT

A pressure/differential pressure measuring device having a range plate with static and differential pressure sensors mounted therein. A high pressure isolation plate is mounted on one side of the range plate with a high pressure diaphragm mounted on the side of the high pressure isolation plate away from the range plate and sealed thereto forming a first fluid chamber between the inside of the high pressure diaphragm and the high pressure isolation plate side of the sensor assemblies. A low pressure isolation plate is mounted on the other side of the range plate with a low pressure diaphragm mounted on the side of the low pressure isolation plate away from the range plate and sealed thereto forming a second fluid chamber between the inside of said low pressure diaphragm and the low pressure isolation plate side of the sensor assemblies. A conduit between the first and second fluid chambers has a range diaphragm mounted to isolate the first and second chambers and means are provided to apply the high and low pressure to the outside of the high and low pressure diaphragms respectively.

12 Claims, 7 Drawing Sheets

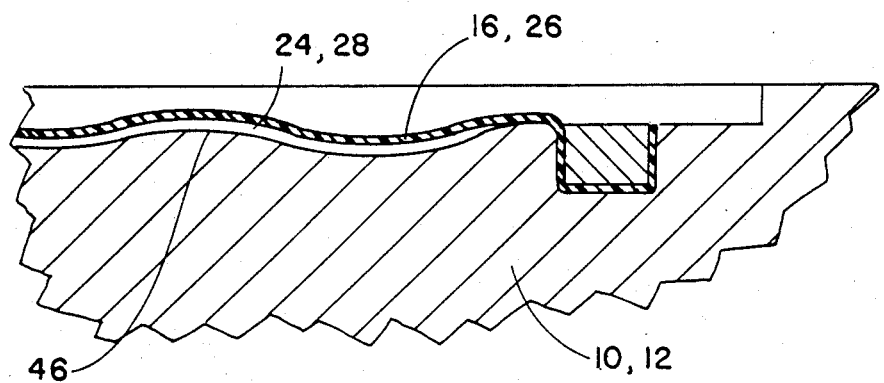
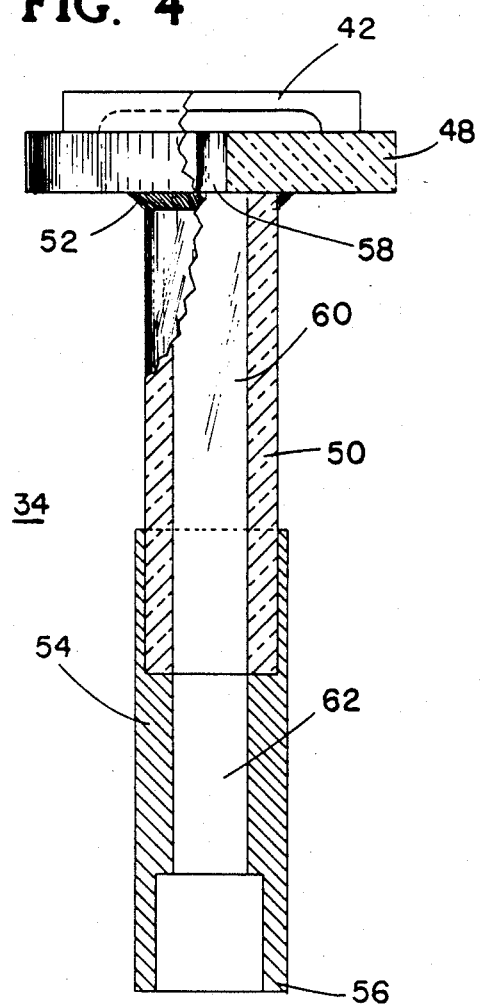
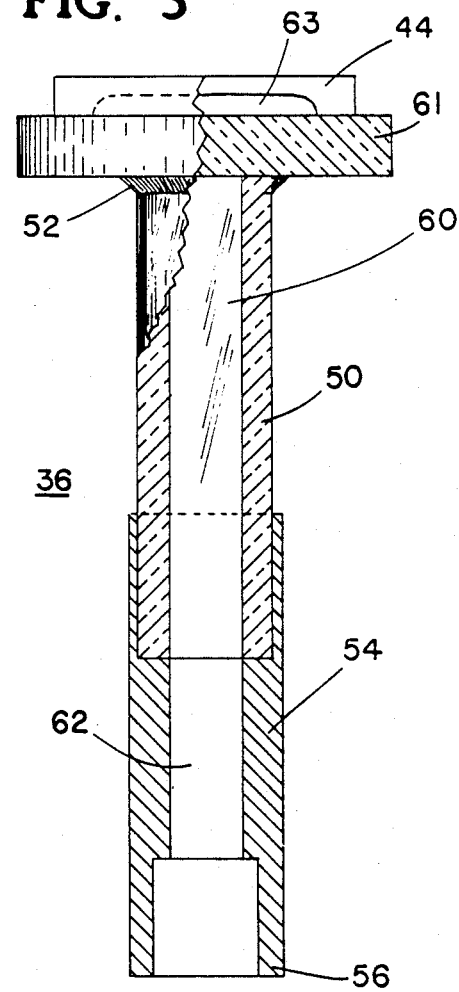

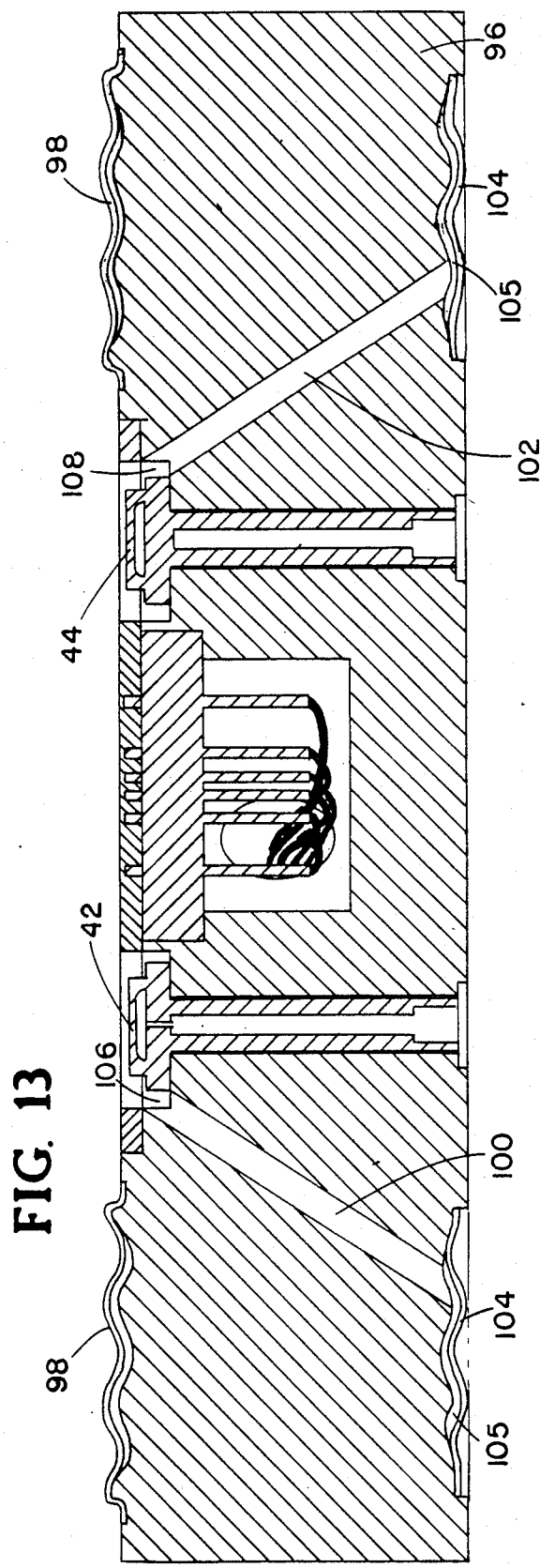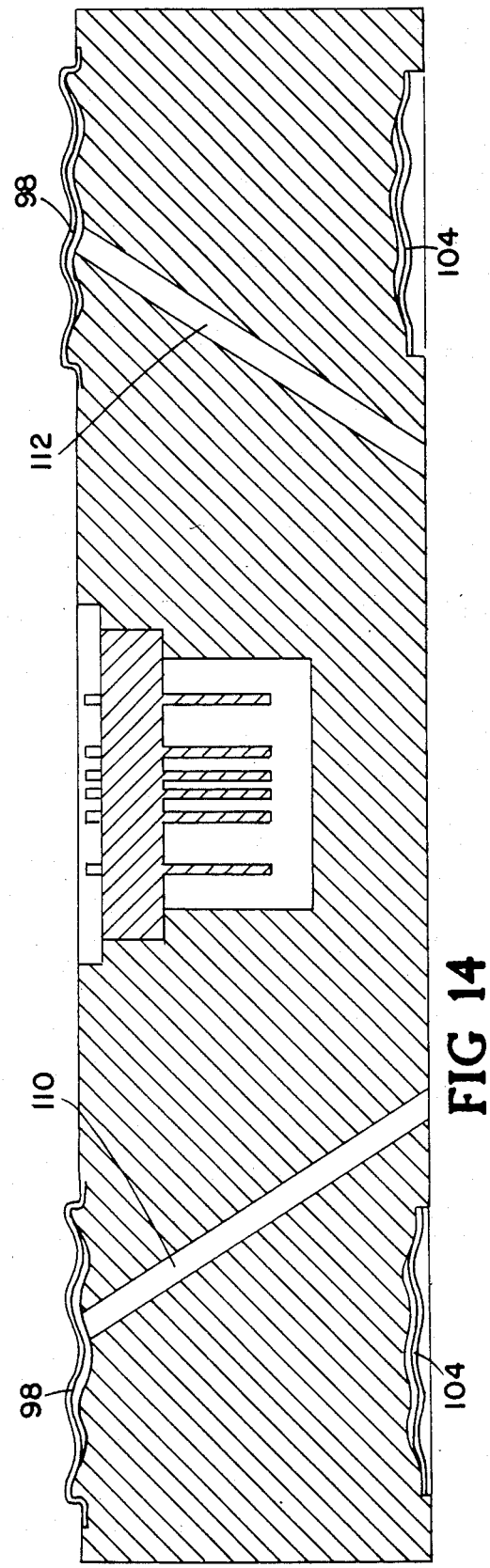

PRESSURE/DIFFERENTIAL PRESSURE MEASURING DEVICE

BACKGROUND OF THE INVENTION

The subject invention relates to pressure/differential pressure measuring devices and more particularly to such devices capable of accurately measuring low differential pressures in the presence of high static line pressures and simultaneously measuring the static pressure.

DESCRIPTION OF THE PRIOR ART

U.S Pat. No. 4,135,408, DiGiovanni—Differential pressure Measuring Transducer Assembly discloses a differential pressure unit having isolation diaphragms with overpressure nesting and a silicon piezoresistive pressure sensor mounted on a range diaphragm for movement therewith.

Foxboro has placed a separate static pressure transducer on a differential pressure sensor.

Honeywell has a unit with overpressure protection which utilizes a valve and piezoresistive sensors.

U.S. Pat. No. 4,712,082 Ito et al. describes a pressure sensor including a metal diaphragm provided at the end of a pressure introduction portion. A glass layer bonded to the surface of the metal diaphragm opposite the pressure introduction side thereof and a semi conductor chip acting as a semi conductor strain gage bonded to the surface of the glass layer. No solder has a thermal expansion coefficient close to that of silicon. Therefore, Ito et al. solved the problem of thermal stress using glass which has a thermal expansion coefficient that can be freely selected from a considerably wide range as an intervening medium between the metal diaphragm and the silicon chip. The design does not have the capability of distancing the silicon chip from the metal support as done in the present invention.

Therefore, it is an object of the present invention to provide a measuring device for accurately measuring low differential pressures in the presence of high static line pressures while simultaneously measuring static pressure.

Another object of the invention is to protect the differential pressure sensor from being exposed to high differential pressures regardless of the side to which the pressure is applied.

SUMMARY OF THE INVENTION

According to a principal aspect of the present invention a pressure/differential pressure measuring device is provided having a range plate with static and differential pressure sensors mounted therein. A high pressure isolation plate is mounted on one side of the range plate and a low pressure on the other. A high pressure diaphragm is mounted on the side of the high pressure isolation plate away from the range plate and sealed thereto. A low pressure diaphragm is mounted on the side of the low pressure isolation plate away from the range plate and sealed thereto. First and second fluid chambers are formed between the high pressure diaphragm and the high pressure isolation plate side of the sensor assemblies and the low pressure diaphragm and the low pressure isolation plate side of the sensor assemblies. A conduit is formed between the first and second fluid chambers with a range diaphragm mounted at the conduit isolating the first and second chambers. Means are provided to apply high and low pressure to the outside of the high and low pressure diaphragms respectively.

In a second aspect of the invention, one side of the range plate has the range diaphragm mounted thereon and a fourth diaphragm is mounted on the range plate with conduit running from the first fluid chamber to its high pressure side. The fourth diaphragm is normally seated and not movable as long as the pressure on the high pressure side remains higher than the pressure on the low pressure side but is capable of movement if the pressure on the low pressure side should exceed that on the high pressure side until such time as the low pressure diaphragm is seated.

Another aspect of the invention is that the pressure sensors employ piezoresistive sensor chips mounted on chip carriers with a hollow stem bonded to the side of the chip carrier away from the chip. The chip carrier and the stem are made of a material to minimize thermal expansion effects on the sensitivity of the sensor. The static sensor chip has a vacuum on its underside between it and the chip carrier. In the differential pressure sensor, an aperture extends through the chip carrier leading to the hollow stem so that the low pressure may be applied to the underside of the chip while the high pressure is applied to the upperside.

Other objects, features and advantages of the invention will become apparent from a reading of the specification when taken in conjunction with the drawings.

BRIEF DESCRIPTION OF THE DRAWINGS

FIG. 3 is a partial section showing the mounting of a typical isolation diaphragm with its nesting configuration, FIG. 4 is a side view of the differential pressure sensor, FIG. 5 is a side view of the static pressure sensor, FIG. 13 is across section of the range plate of FIG. 12 showing the sensor assemblies taken at Section A—A and showing the conduits from the low pressure side range plate to the high pressure chamber, and FIG. 14 is a second cross section taken at E—E in FIG. 12 showing the conduits from the high pressure range plate to the low pressure chamber.

DESCRIPTION OF THE PREFERRED EMBODIMENTS

The subject invention relates to a pressure/differential pressure measuring device contained in a single capsule and capable of accurately measuring low differential pressures in the presence of high static line pressures while measuring static pressures separately. The device provides protection to the pressure sensors from being exposed to high pressures. The pressure sensing elements are of the piezoesistive type. A simple three or four diaphragm capsule design is employed with gross over pressure protection in two directions.

Figure 1:
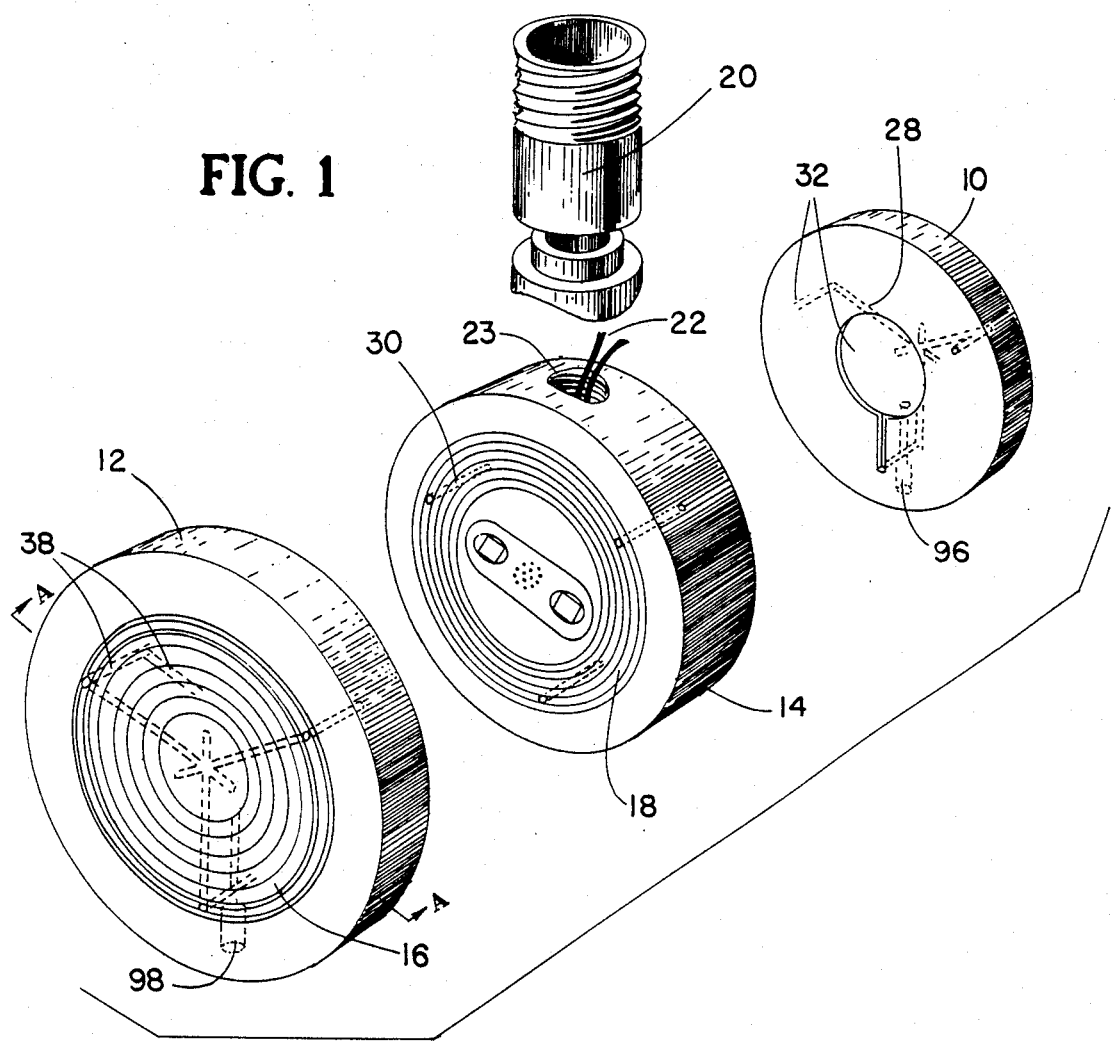
FIG. 1 is an exploded isometric view of a range plate and high and low pressure isolation plates showing a high pressure diaphragm and the range diaphragm with several of the fluid conduits being shown in hidden lines.
Figure 2:
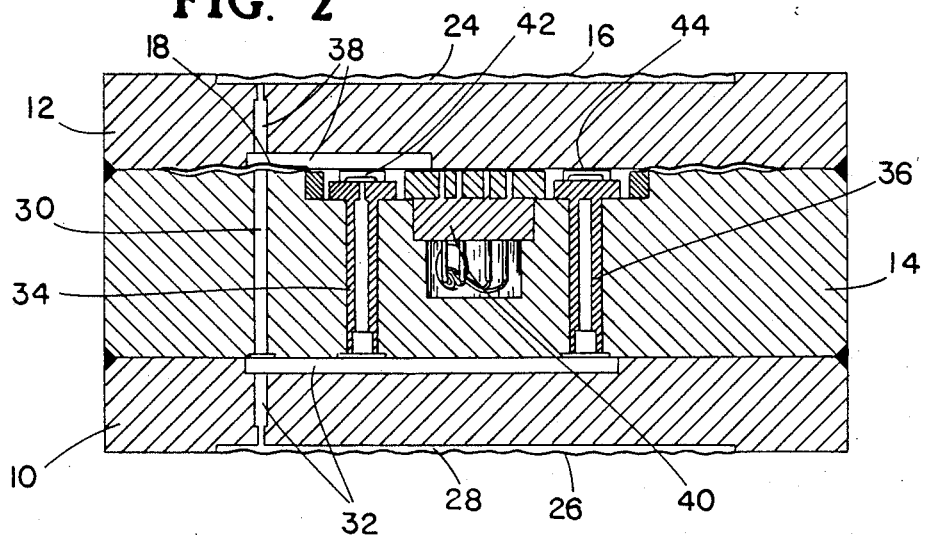
FIG. 2 is a cross-section of the range plate and the high and low pressure, isolation plates showing the various diaphragms and the sensor assemblies.

The capsule is made up of three major parts. Referring to FIG. 1, it employs a low pressure isolation plate 10, a high pressure isolation plate 12, and a range plate 14. A high pressure isolation diaphragm 16 is mounted on the high pressure side of plate 12. A low pressure diaphragm shown at 26 in FIG. 2 is mounted on the opposite side of plate 10. A range diaphragm 18 is mounted on the high pressure side of range plate 14. Electrical connections are made to the sensors through a connector stem 20 with the leads 22 being taken out of the hole 23 in range plate 14.

Turning to FIG. 2, there is shown a cross section of the assembly of FIG. 1 taken along the lines A—A. The high pressure isolation plate 12 is shown with the diaphragm 16 joined thereto and forming a chamber 24 between it and the isolation plate 12. Similarly, the low pressure isolation plate 10 has a diaphragm 26 joined thereto and forming a chamber 28 between it and the isolation plate 10. The range diaphragm 18 is mounted at the high pressure side of a conduit 30 which extends between a series of conduits 32 going from the low pressure isolation chamber 28 to the underside of differential pressure sensor 34 and static pressure sensor 36. The chamber 24 on the high pressure side goes through a series of conduits 38 to the high pressure side of the range diaphragm 18 and the high pressure side of sensor assemblies 34 and 36. A hermetically sealed header 40 is used to take the leads from the sensor chips 42 and 44 outside the measuring device.

Turning now to FIG. 3, a typical isolation diaphragm for either the high or low pressure side is illustrated. The diaphragm 16, 26 defines a chamber 24, 28 between it and isolation plate 10, 12. Over-pressure nesting protection is provided by seat 46 against which diaphragms 16 or 26 nest when pressure is sufficient to do so scooping the application of additional pressure against the sensors and preventing the rupture of the sensor chips 42 and 44.

Additional structural detail of the sensor assemblies is shown in FIGS. 4 and 5. FIG. 4 illustrates the differential pressure sensor assembly having sensor chip 42 mounted on a chip carrier 48. This embodiment shows a hollow glass stem 50 bonded to the underside of chip 48 at 52. A stainless steel stem mount 54 is bonded to glass stem 50 sufficiently far down the glass stem to minimize thermal expansion effects and may be joined on its other end 56 to the low pressure side of the range plate 14. It can be seen that there is an aperture 58 through the center of the chip carrier 48 which is in line with the hollow portion 60 of the glass stem 50 and the hollow portion 62 of the stainless steel stem mount 54 such that low pressure may be applied against the bottom of sensor chip 42 via the conduits 32.

The static pressure sensor in FIG. 5 is the same as the differential pressure sensor of FIG. 4 except that there is no hole 58 in the static chip carrier 61 instead there is a vacuum in the chamber 63 so that the static pressure may be measured between the outside of chip 44 which is at the pressure in conduits 38 and the vacuum.

The stems of sensor assemblies 34 and 36 are preferably of materials recited above. However, ceramic materials may be used in place of glass and in some instances, also for chip carriers 48 and 61 and stem mounts 54, as long as the combination of materials sufficiently minimizes the thermal expansion effects on the sensitivity of the sensors.

Figure 6:
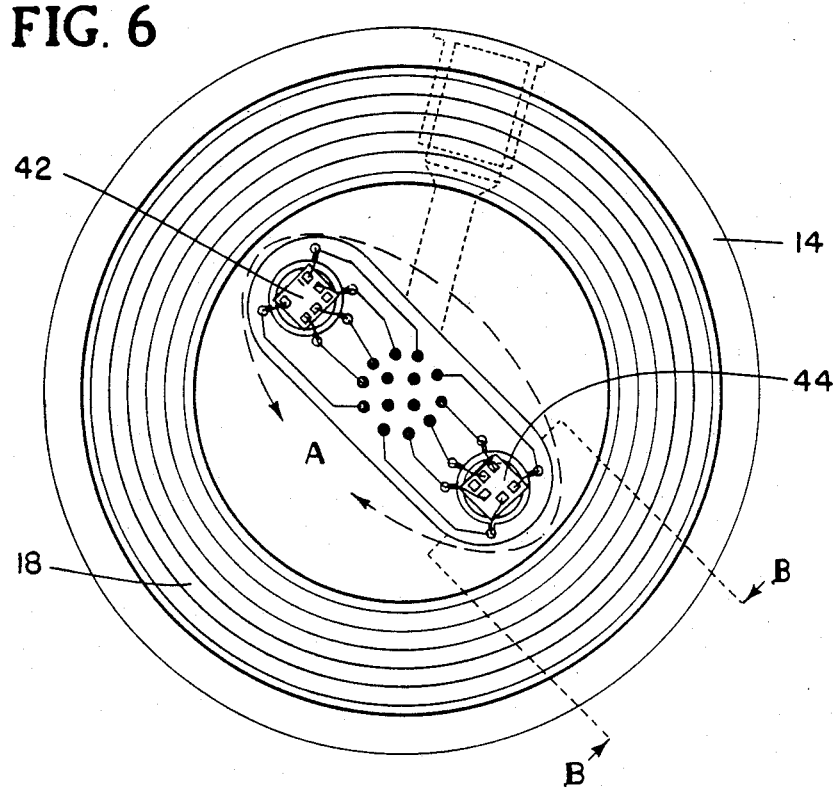
FIG. 6 is a top view looking down on the assembled range plate.

Turning now to FIG. 6, there is shown a top view of the range plate 14 having range diaphragm 18 mounted thereon. The tops of the sensor chips 42 and 44 are shown.

Figure 7:
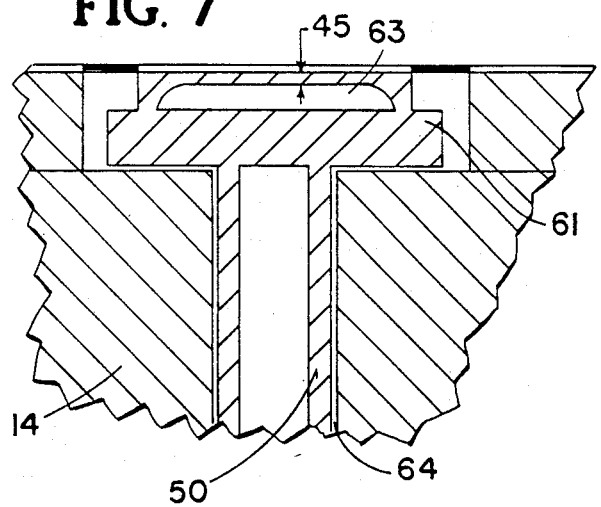
FIG. 7 is a partial cross-section of the static sensor assembly taken at Section B—B of FIG. 6.

Turning to FIG. 7, a partial cross section at B—B in FIG. 6 is shown illustrating the mounting of the static sensor assembly having a strain gauge barrier 45 mounted on the chip carrier 61 with glass stem 50 extending downward through the hole 64 in range plate 14. The vacuum chamber 63 is shown between the strain gauge barrier 45 and the chip carrier 60.

Figure 8:
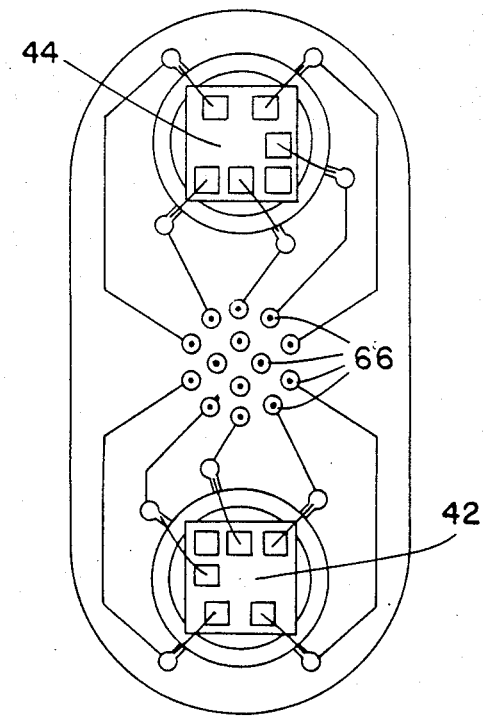
FIG. 8 is a detail taken at A of FIG. 6 showing the connections from the static and differential pressure assemblies to the outside cable.

Turning now to FIG. 8 which is taken as detail A of FIG. 6, the differential pressure chip 42 and the static pressure chip 44 are shown interconnected to the hermetic seal connector through contacts 66.

Figure 9:
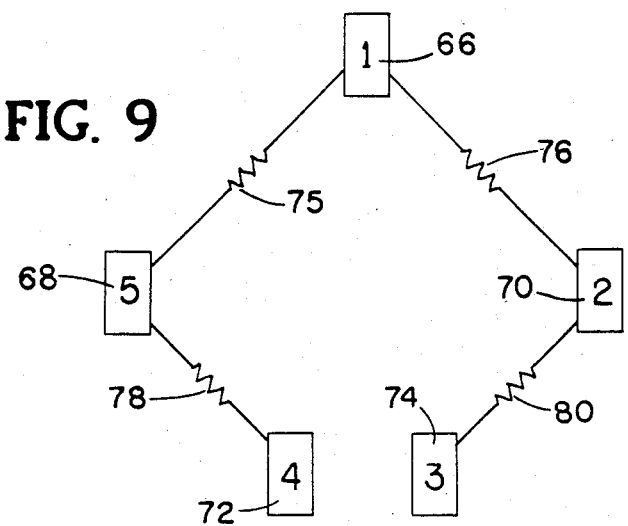
FIG. 9 is as schematic of the differential pressure and static pressure sensor chips.

FIG. 9 shows the configuration of the bridge sensors on chips 42 and 44 with a one milliamp input at terminal 66 and output across terminals 68 and 70. Return and zero compensation are provided across terminals 72 and 74. The resistive elements 75, 76, 78 and 80 form the arms of a wheatstone bridge. The configuration of these elements on the chips 42 and 44 can best be seen by referring to FIG. 10 where the configuration of the piezoresistive elements is such that when pressure is exerted downward on the diaphragm 82, elements 75 and 80 are placed in what is called compression because their resistance goes down whereas elements 76 and 78 are placed in what is called tension because their resistance goes up. This is because the long legs of the elements 76 and 78 are radial whereas the long legs of the elements 75 and 80 run generally perpendicular to the radius of the diaphragm 82.

Figure 11:
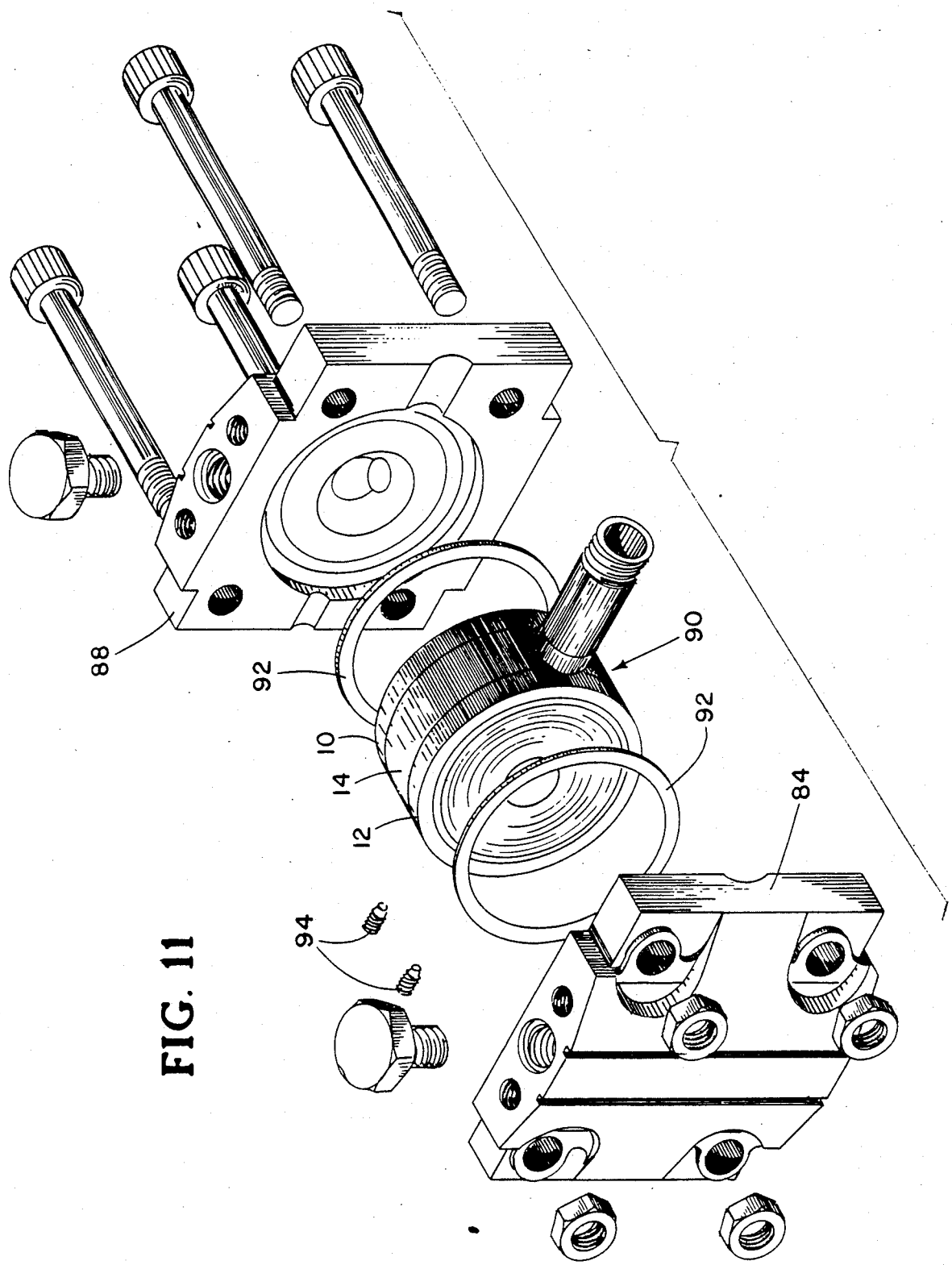
FIG. 11 is an exploded isometric drawing showing the assembly of the sensor capsule to the high pressure and low pressure process flanges.

FIG. 11 illustrates the assembly in an exploded isometric view showing the high and low pressure process flanges 84 and 88 which are sealed to the capsule 90 which is comprised of the range plate 14 and high and low pressure isolation plates 12 and 10 respectively by seal O-rings 92.

Fill plugs 94 are used to seal the fill plug conduit 96 of the low pressure side and 98 of the high pressure side shown in FIG. 1 through which the low pressure side 32 and high pressure side 38 of the assembly shown in FIG. 2 are filled with fluid.

Figure 10:
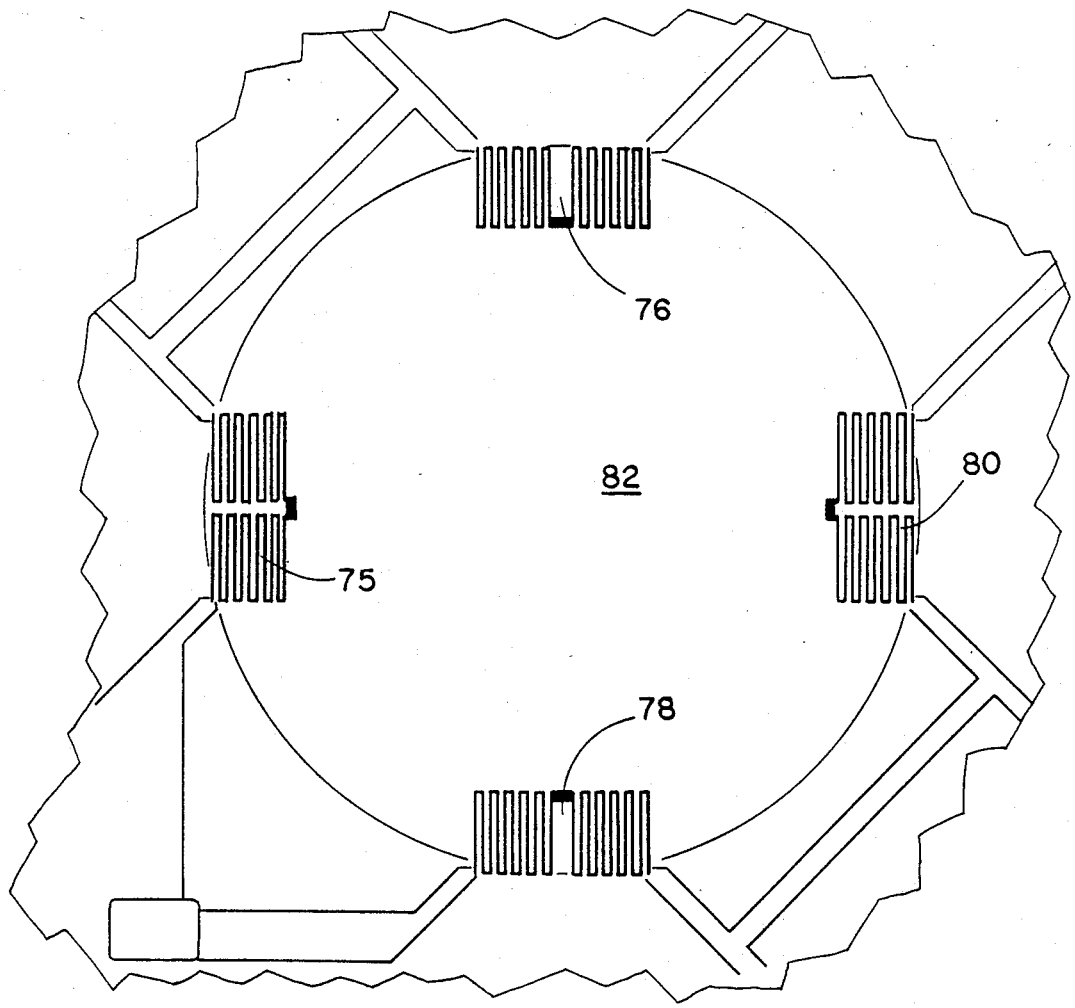
FIG. 10 illustrates the sensor configuration on the sensor chips.

The internal space between the two isolation diaphragms 16 and 26 is divided almost in half by the range diaphragm 18. Pressure applied to each isolation diaphragm via the process flanges 84 and 88 shown in FIG. 11 is transferred to the pressure sensors through the fill fluid. The differential pressure sensor has exposure to both pressure chambers via channels 32 and 38 of FIG. 2 such that the net pressure developed across it is almost equal to the difference in pressure applied between the low and high pressure sides of the capsule. The static pressure sensor measures absolute pressure and has exposure to the high pressure side 38 only, with its backside evacuated. The sensors are of the piezoresistive type and operate on the principal of change of electrical resistance with pressure. On each sensor a thin diaphragm has been formed by a selective etching process as shown in FIG. 10. The pressure induced stresses on the diaphragm are sensed by the four piezoresistors 75, 76, 78 and 80 placed on the diaphragm 82 in the form of the wheatstone bridge show in FIG. 9. Output of a properly excited bridge is proportional to the differential pressure developed across the sensor. The sensor assemblies shown in FIGS. 4 and 5 are configured as described to minimize the mounting effects. It also reduces static pressure and temperature sensitivity on the differential sensor assembly and the equivalent on the static sensor. Both sensor outputs are carried out through the hermetically sealed header 40 shown in FIG. 2 which is mounted on the range plate 14.

The rang diaphragm 18, also mounted on the range plate 14, controls the maximum pressure developed between the high and low pressure chambers. The range diaphragm as a pressure summing element responds to differential pressure across it by moving in the direction of low pressure and in doing so displaces a volume proportional to its effective surface area and its travel. The range diaphragm is designed to have a linear volumetric displacement as a function of pressure within its rated pressure range. As the range diaphragm 18 moves it withdraws liquid from the backside of the isolation diaphragm 16 which is at higher pressure. Without the liquid support the isolation diaphragm 16 is drawn into its corresponding nesting plate 46 shown in FIG. 3. Once the high pressure side isolation diaphragm 16 has completely bottomed out on its nesting plate 46 all the internal parts are protected from further increases of external pressure assuming that the temperature remains constant. This function of the device protects the differential pressure sensor 34 and more particularly the sensor chip 42 from being exposed to high differential pressures beyond its rated safe working pressure.

When the excessive over pressure is removed from the capsule, energy stored in the range diaphragm 18 and the isolation diaphragm 16 would facilitate the release of the high pressure side isolation diaphragm 16 from its nesting plate 46. For each nominal pressure range suitable static and differential pressure sensors and a rang of diaphragms may be selected. The rest of the parts are common between capsules. Two or three range diaphragms would cover most of the differential pressure ranges commonly measured in the industry.

Advantages of the foregoing design include:
1. Pressure and differential pressure measurement capability within the same package.
2. Gross over pressure protection, that is survivability, if high pressure is accidentally connected to the low pressure side.
3. A limited number of parts are involved increasing the reliability of the device.
4. An extensive use is made of common parts reducing the cost.
5. Preserves the sensor characteristics.

Figure 12:
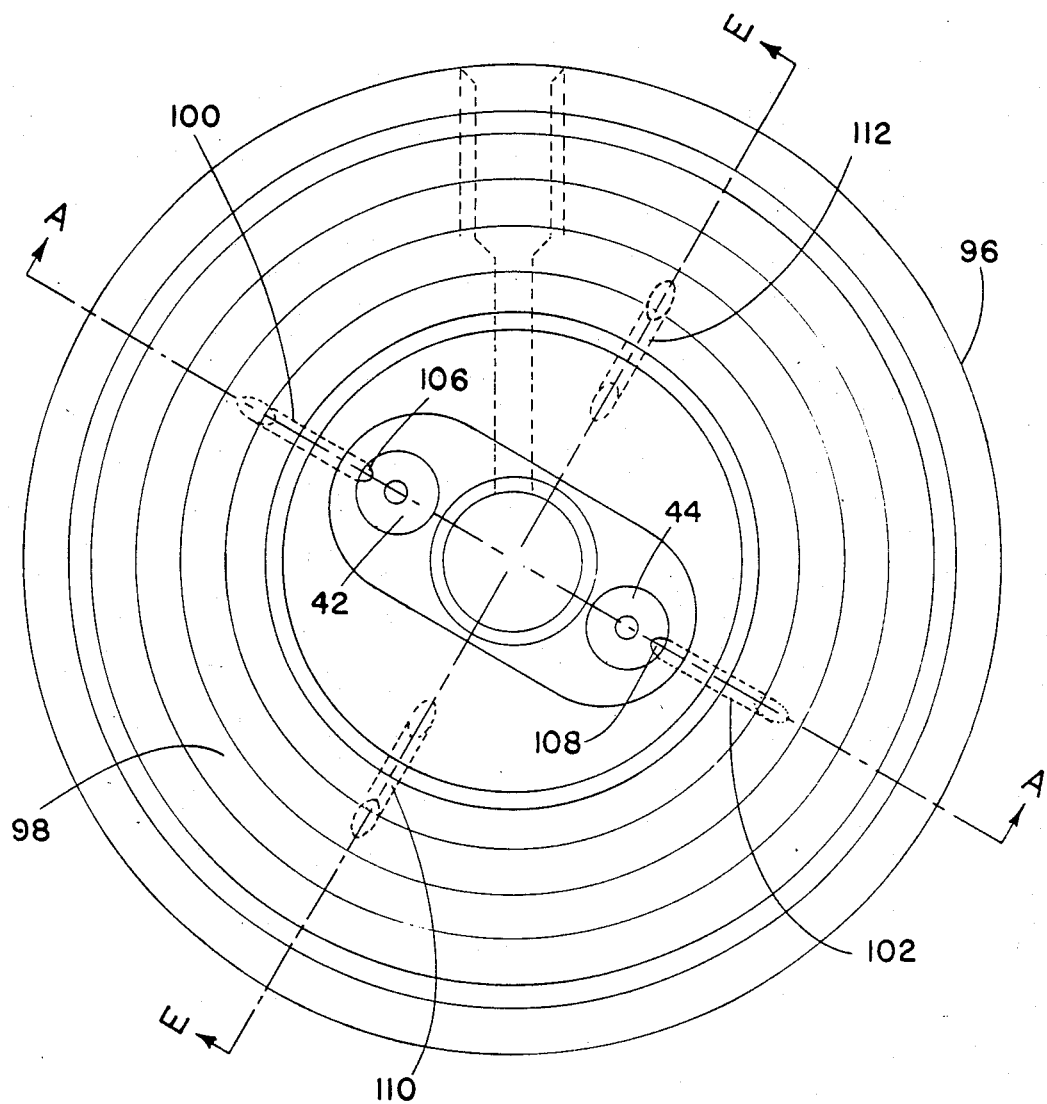
FIG. 12 is a top view of an assembled range plate illustrating a second embodiment of the invention having two range diaphragms.

A second embodiment is shown in FIGS. 12 through 14, wherein FIG. 12 illustrates a top view of the embodiment, range plate 96 having a range diaphragm 98 and differential pressure and static pressure sensors 42 and 44 respectively. FIG. 13 is a section through FIG. 12 taken along lines A—A and shows two conduits 100 and 102 which extend from a fourth diaphragm 104 upward to the sensors through hole 106 and 108 shown in FIG. 12 as well. Diaphragm 104 is normally seated against its pressure isolation plate (not shown) and is free to move into space 105 and displace fluid therein if the pressure on its underside becomes higher than that on its upper side but will not seat against the range plate 96 because the low pressure diaphragm 26 will seat first. FIG. 14 shows a cross section of FIG. 12 taken along line E—E showing two additional conduits 110 and 112 going from the underside of range diaphragm 98 to the low pressure side of the sensors 42 and 44. Fourth diaphragm 104 is normally seated against the low pressure isolation plate (not shown) and not movable as long as the pressure on the high pressure side remains higher than the pressure on the low pressure side but is capable of movement if the pressure on the low pressure side should exceed that on the high pressure side until such time as the low pressure diaphragm 26 is seated. This is to accept oil from the diaphragm 26 on the low pressure side to protect the sensor chip from overpressure because the sensor chip is more susceptible to damage from overpressure on the low pressure side.

While particular embodiments of the invention have been described it will be understood of course that it is not intended to limit the invention thereto since many modifications may be made both in configuration and, for example, in the materials for the sensor mounts. It is therefore contemplated by the appended claims to cover any such modifications as fall within the true spirit and scope of the invention.

What is claimed is:

1. A pressure/differential pressure measuring device comprising; a range plate, a static pressure sensor assembly and a differential pressure sensor assembly mounted in said range plate, a high pressure isolation plate mounted on one side of said range plate, a high pressure diaphragm mounted on the side of said high pressure isolation plate away from said range plate and sealed thereto, a first fluid chamber between the inside of said high pressure diaphragm and the high pressure isolation plate side of said sensor assemblies, a low pressure isolation plate mounted on the other side of said range plate, a low pressure diaphragm mounted on the side of said low pressure isolation plate away from said range plate and sealed thereto, a second fluid chamber between the inside of said low pressure diaphragm and the low pressure isolation plate side of said sensor assemblies, a conduit between said first and second fluid chambers, a range diaphragm mounted at said conduit isolating said first and second chambers, and means to apply high and low pressure to the outside of said high and low pressure diaphragms respectively.

2. The pressure measuring device of claim 1 in which means are provided for seating the high pressure diaphragm against the high pressure isolation plate and the low pressure diaphragm against the low pressure isolation plate after application of pressure to prevent overpressure application against the sensors.

3. The measuring device of claim 2 having said range diaphragm mounted on one side of said range plate and capable of movement with respect to the range plate until the high pressure diaphragm is seated.

4. The pressure measuring device of claim 3 including a fourth diaphragm mounted on the range plate and having a conduit running from the first fluid chamber to its high pressure side, said fourth diaphragm being normally seated and not movable as long as the pressure on the high pressure side remains higher than the pressure on the low pressure side but capable of movement if the pressure on the low pressure side should exceed that on the high pressure side until such time as the low pressure diaphragm is seated.

5. The measuring device of claim 1 in which said differential pressure sensor comprises a piezoresistive sensor chip mounted on a chip carrier having an aperture therethrough leading to a chamber on the underside of said sensor chip, a hollow stem bonded to the side of said chip carrier away from said chip with said aperture in communication with the hollow inside said stem, means bonding the other end of said stem to the low pressure side of said range plate, said chip carrier and said stem being made of a material to minimize thermal expansion effects on the sensitivity of said sensor.

6. The measuring device of claim 5 in which said chip carrier and said stem are nonmetallic.

7. The measuring device of claim 6 wherein said nonmetallic stem is ceramic.

8. The measuring device of claim 1 in which said differential pressure sensor comprises a piezoresistive sensor chip mounted on a glass chip carrier having an aperture therethrough leading to a chamber on the underside of said sensor chip, a hollow glass stem bonded to the side of said chip carrier away from said chip with said aperture in communication with the hollow inside said stem, a hollow metallic stem mount mounted to said glass side by epoxy sufficiently far down said glass stem to minimize thermal expansion effects and joined on its other end to the low pressure side of said range plate.

9. The measuring device of claim 1 in which said static pressure sensor comprises a piezoresistive sensor chip having an evacuated chamber on a side which is mounted on a chip carrier, a stem bonded to the side of said chip carrier away from said chip and joined on its other end to the low pressure side of said range plate said chip carrier and stem being made of a material to minimize thermal expansion effects on said sensor.

10. The measuring device of claim 9 in which said chip carrier and stem are nonmetallic.

11. The measuring device of claim 10 in which said nonmetallic stem is ceramic.

12. The measuring device of claim 1 in which said static pressure sensor comprises a piezoresistive sensor chip having a evacuated chamber on one side which is mounted on a glass chip carrier, a glass stem bonded to the side of said chip carrier away from said chip, a metallic stem epoxied to said glass stem sufficiently far down said glass stem to minimize thermal expansion effects and joined on its other end to the low pressure side of said range plate.

* * * * *